(12) United States Patent
Vaßen et al.

(10) Patent No.: US 12,385,415 B2
(45) Date of Patent: Aug. 12, 2025

(54) OPERATION OF A GAS TURBINE AT A HIGH TEMPERATURE AND GAS TURBINE ASSEMBLY

(71) Applicant: FORSCHUNGSZENTRUM JÜLICH GMBH, Jülich (DE)

(72) Inventors: Robert Vaßen, Herzogenrath (DE); Daniel Emil Mack, Cologne (DE); Martin Tandler, Viersen (DE); Olivier Guillon, Jülich (DE)

(73) Assignee: FORSCHUNGSZENTRUM JÜLICH GMBH (DE)

( * ) Notice: Subject to any disclaimer, the term of this patent is extended or adjusted under 35 U.S.C. 154(b) by 70 days.

(21) Appl. No.: 17/924,045

(22) PCT Filed: Apr. 22, 2021

(86) PCT No.: PCT/EP2021/060533
§ 371 (c)(1),
(2) Date: Nov. 8, 2022

(87) PCT Pub. No.: WO2021/233640
PCT Pub. Date: Nov. 25, 2021

(65) Prior Publication Data
US 2023/0184132 A1 Jun. 15, 2023

(30) Foreign Application Priority Data
May 19, 2020 (DE) .................. 10 2020 206 269.2

(51) Int. Cl.
*F01D 21/12* (2006.01)

(52) U.S. Cl.
CPC .......... *F01D 21/12* (2013.01); *F05D 2220/32* (2013.01); *F05D 2270/112* (2013.01);
(Continued)

(58) Field of Classification Search
CPC .... F01D 21/00; F01D 21/12; F05D 2270/112; F05D 2300/2118; F05D 2300/611
See application file for complete search history.

(56) References Cited

U.S. PATENT DOCUMENTS

| 6,253,537 B1 | 7/2001 | Suenaga et al. |
| 2003/0087120 A1* | 5/2003 | Torigoe ................... C23C 30/00 |
| | | 428/629 |

(Continued)

FOREIGN PATENT DOCUMENTS

| DE | 10008861 A1 | 9/2001 |
| EP | 1514953 A2 | 3/2005 |

(Continued)

OTHER PUBLICATIONS

Office Action for German Application No. 10 2020 206 269.2, dated Dec. 2, 2020, pp. 1-10.
(Continued)

*Primary Examiner* — Courtney D Heinle
*Assistant Examiner* — Cameron A Corday
(74) *Attorney, Agent, or Firm* — Dickinson Wright PLLC

(57) ABSTRACT

The disclosure relates to a method for operating a gas turbine at a high temperature and to a gas turbine assembly. In the method, a gas turbine having a structural material and a thermal barrier layer disposed on the structural material is cooled down in a decelerated manner after operation at an operating temperature above 1000° C., so that damage to the structural material and/or the thermal barrier layer is minimized. In this way, the gas turbine can be operated permanently at temperatures above 1500° C.

19 Claims, 1 Drawing Sheet

Figure 1:
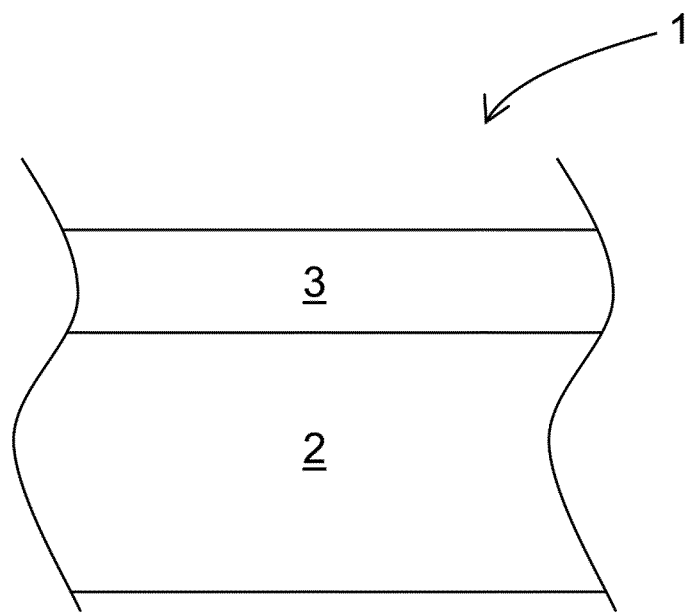

(52) U.S. Cl.
CPC .............. *F05D 2270/303* (2013.01); *F05D 2300/2118* (2013.01); *F05D 2300/611* (2013.01)

(56) References Cited

U.S. PATENT DOCUMENTS

| | | | | |
|---|---|---|---|---|
| 2003/0224200 | A1* | 12/2003 | Bruce | C23C 14/083 428/632 |
| 2004/0237535 | A1* | 12/2004 | Ainsworth | F01D 19/02 60/39.511 |
| 2010/0042438 | A1* | 2/2010 | Moore | G16B 20/10 705/3 |
| 2010/0043438 | A1* | 2/2010 | Barber | B08B 5/00 60/657 |
| 2010/0280733 | A1 | 11/2010 | Jordan, Jr. et al. | |
| 2010/0287944 | A1* | 11/2010 | Draper | F02C 9/00 60/772 |
| 2018/0066527 | A1* | 3/2018 | Kadau | F01D 11/122 |
| 2018/0274387 | A1 | 9/2018 | Hartshorn et al. | |
| 2019/0032189 | A1* | 1/2019 | Chen | C23C 4/134 |

FOREIGN PATENT DOCUMENTS

| | | |
|---|---|---|
| EP | 2067965 A1 | 6/2009 |
| EP | 2194236 A1 | 6/2010 |
| EP | 3333279 A1 * | 6/2018 |

OTHER PUBLICATIONS

International Search Report with English Translation and Written Opinion for PCT Application No. PCT/EP2021/060533, dated Jul. 27, 2021, pp. 1-15.

International Preliminary Report on Patentability for PCT Application No. PCT/EP2021/060533, dated Sep. 26, 2022, pp. 1-6.

Vaßen et al., "Performance of YSZ and Gd2Zr2O7/Ysz double layer thermal barrier coatings in burner rig tests," Journal of the European Ceramic Society, Oct. 13, 2019, pp. 1-11.

* cited by examiner

OPERATION OF A GAS TURBINE AT A HIGH TEMPERATURE AND GAS TURBINE ASSEMBLY

CROSS-REFERENCE TO RELATED APPLICATION(S)

This present application is a national stage application of International Patent Application No. PCT/EP2021/060533, filed Apr. 22, 2021, which claims priority to German Patent Application No. 10 2020 206 269.2, filed May 19, 2020, the disclosures of which are hereby incorporated by reference in their entireties.

The invention relates to a method of operating a gas turbine at a high temperature and to a gas turbine assembly.

The efficiency of gas turbines increases with temperature. Since the structural materials of gas turbines cannot exceed material-dependent maximum temperatures without permanent damage, thermal barrier layers are used. These are arranged on the structural materials and protect the structural materials from the high temperatures of the hot gas in the gas turbine. Typically, the thermal barrier layers have a thickness of several 100 μm and are designed in terms of material and composition to allow a temperature difference of more than 100 K, in particular several 100 K, between the hot gas and the structural material.

A nickel-based superalloy, for example, can be used as the structural material of a gas turbine. To prevent long-term damage, this must not be loaded above 1100° C. By using a suitable thermal barrier layer, it is nevertheless possible with this material to operate the gas turbine at 1200° C. without loading the structural material above its maximum temperature and thus achieve increased efficiency. A particular challenge here is the cyclic temperature load.

A material typically used in thermal barrier layers is zirconium oxide partially stabilized with yttrium oxide (YSZ). According to common opinion, this material is limited to maximum temperatures of 1200° C. in long-term use, since a damaging transformation of the metastable tetragonal primary phase occurs and sintering processes also occur more frequently. DE 100 08 861 A1 describes a component with a multilayer thermal barrier layer on its surface, which includes YSZ or a glass-metal composite. The multilayer structure makes operation above 1200° C. possible. The publication "Performance of YSZ and $Gd_2Zr_2O_7$/YSZ double layer thermal barrier coatings in burner rig tests" by Vaßen et al., published in the Journal of the European Ceramic Society, also describes multilayer thermal barrier layers. Other materials with high temperature resistance, such as pyrochlore, often have mechanically poorer properties and/or the manufacturing effort is high.

It is the task of the invention to operate gas turbines permanently at higher temperatures.

The task is solved by the method for operating a gas turbine at a high temperature according to claim 1 and by the gas turbine assembly according to claim 15. Advantageous embodiments are given in the subclaims.

A method for operating a gas turbine at a high temperature serves to solve the task, in which a gas turbine having a structural material and a protective layer such as a thermal barrier layer or a corrosion protection layer disposed on the structural material is cooled down in a decelerated manner after operation at an operating temperature above 1000° C. In particular, this is done in such a way that damage to the structural material and/or the protective layer is minimized.

The decelerated cool-down causes the protective layer and the structural material to undergo a slower temperature change. This prevents or minimizes the significant damage processes that occur during the rapid cool-down of gas turbines. Such damage processes occur during cool-down processes that start at temperatures above 1000° C., in particular at significantly higher temperatures. In particular, operation at a high temperature means operation at an operating temperature above 1200° C. The method may comprise operation at an operating temperature above 1000° C. A decelerated cool-down means a cool-down that occurs more slowly than a conventional cool-down, for example as a result of an immediate and/or complete shutdown of the gas turbine. The cool-down takes place in a decelerated manner at least for periods of time. Thus, in addition to a temporarily decelerated cool-down, a conventional, in particular immediate, cool-down can also take place before and/or after this.

A gas turbine is an internal combustion engine in which a fuel is burned to produce mechanical power. The gas turbine comprises a gas expansion turbine, i.e., a fluid machine in which a pressurized gas expands and performs work. The gas turbine further typically includes an upstream compressor and a combustor arranged between the gas expansion turbine and the compressor.

The structural material typically comprises or consists of a highly heat resistant metal alloy and/or a ceramic matrix. In particular, the structural material forms functional elements of the gas turbine or at least parts thereof, such as shrouds, supports, guide vanes, rotor blades, linings, compressor blades, shafts, etc. The structural material may also consist of or include a fiber composite material.

The protective layer protects the structural material, in particular from high temperatures, such as in the case of a fiber composite material. It can be designed as a corrosion protection layer. Everything said about the thermal barrier layer can also apply to the protective layer.

The thermal barrier layer protects the structural material from excessive heat exposure. It can comprise or be produced from ceramics, for example. In particular, the thermal barrier layer is designed to permanently withstand high temperatures of 1200° C., in particular 1300° C., for example 1400° C., preferably 1500° C., particularly preferably 1550° C. and in one embodiment 1600° C.

The thermal barrier layer is arranged on the structural material. It is therefore arranged between the structural material and an interior of the turbine in which hot gas is present during operation. It is not excluded that at least one further layer, for example an adhesion promoter layer, is arranged between the structural material and the thermal barrier layer. This can be a nickel-based superalloy, for example. It typically includes aluminum, for example in the form of aluminides, or NiCoCrAlY.

The operating temperature as well as other temperatures of the gas turbine refer to the interior of the gas turbine, for example to the hot gas located therein. They can also refer to the outer surface of the thermal barrier layer. This is typically below the gas temperature during operation. An operating temperature is a temperature which prevails inside the gas turbine at least temporarily during operation.

Cool-down means the reduction of the temperature. In particular, a cool-down after operation at high temperature and/or a cool-down during a shutdown of the gas turbine is meant. The gas turbine can continue to operate after cool-down, especially at reduced power.

The decelerated cool-down reduces the temperature gradients within the thermal barrier layer. In conventional operation, an abrupt change in gas turbine power, e.g. at an immediate shutdown, results in an immediate cool-down of the gases inside the gas turbine and thus of the outer surface of the thermal barrier layer. The structural material, on the other hand, to which the inner surface of the thermal barrier layer faces and in particular bears against, still has a significantly higher temperature. This results in high thermal stress, which is prevented by the method according to the invention.

In one embodiment, the thermal barrier layer consists of a single layer or ply. Here, too, an additional adhesion promoter layer may be provided. The decelerated cool-down enables the use of a thermal barrier layer consisting of only one layer. Compared to multilayer systems, the effort and cost of producing is thus reduced.

In one embodiment, the decelerated cool-down is performed at a cooling rate of less than 100 K/s, in particular less than 50 K/s.

The cooling rate means the change in temperature over time. The decelerated cool-down can be performed at a cooling rate of less than 100 K/s, in particular less than 50 K/s, for example less than 30 K/s. Preferably, the cooling rate is between 1 K/s and 20 K/s, particularly preferably between 3 K/s and 15 K/s, and in one example between 5 K/s and 10 K/s. If the cooling rate is too high, damage to the structural material and/or thermal barrier layer cannot be sufficiently minimized. A cooling rate that is too low, in particular below 1 K/s, leads to damaging phase transformations. The above-mentioned cooling rates have been shown in experiments to be particularly effective in minimizing damage processes, depending on the specific application.

In one configuration, the cooling rate is reduced during decelerated cool-down. Thus, at lower temperatures, cooling down is performed at an even lower cooling rate than at higher temperatures. For example, the cooling rate is reduced below 500° C. The further reduced cooling rate can prevent damaging transformation of the crystal structure at lower temperatures.

This embodiment significantly increases the fatigue strength of the thermal barrier layer and enables long-term operation of gas turbines at elevated hot gas temperatures and associated surface temperatures of the thermal barrier layer above 1400° C. This brings significantly increased efficiency compared to the prior state.

In one embodiment, the protective layer includes or is produced from zirconium oxide. In particular, zirconium oxide stabilized with yttrium oxide, preferably zirconium oxide partially stabilized with yttria is meant. Here, the protective layer is typically a thermal barrier layer.

Zirconium oxide means in particular zirconium(IV) oxide $ZrO_2$. Yttrium oxide means $Y_2O_3$. Zirconium oxide stabilized with yttrium is generally referred to as YSZ (yttria-stabilized zirconia). Here, the cubic crystal structure of zirconium dioxide is stabilized at room temperature by the addition of yttria. This material thus enables particularly room-temperature-stable thermal barrier layers.

Zirconium oxide stabilized with yttrium oxide means partially or fully stabilized zirconium oxide. In particular, zirconium oxide partially stabilized with yttrium oxide is used. This can be partially stabilized with 4-5 mol % yttrium oxide and is therefore referred to as 4-5 YSZ.

This embodiment further makes it possible to achieve improved toughness and, associated with this, better cyclic behavior and higher erosion resistance compared to other materials with equally high or higher temperature resistance. Furthermore, a thermal barrier layer with zirconium oxide is easy to produce compared to other materials. In particular, proven methods are known to adjust the required high porosities. The manufacturing process is easy to control.

Alternatively or complementarily, the thermal barrier layer may comprise pyrochlore such as $Gd_2Zr_2O_7$, perovskites, other doped variants of zirconium oxide and/or an adhesion promoter layer. It may be produced in a single layer or in multiple layers. It may have a zircon layer. For example, a two-layer thermal barrier layer may be arranged. Its upper layer, facing away from the structural component, may comprise or consist of $Gd_2Zr_2O_7$. Alternatively or complementarily, its lower layer facing the structural component may comprise or consist of YSZ.

In one embodiment, the gas turbine is operated before a cool-down with an operating temperature above 1200° C., in particular above 1300° C., for example above 1400° C., preferably above 1500° C. and particularly preferably above 1550° C. In particular, the decelerated cool-down or a non-decelerated cool-down immediately before or after it is meant.

In one embodiment, the gas turbine is operated at an operating temperature above 1500° C. or even above 1600° C. before the cool-down. Such high operating temperatures are possible due to the decelerated cool-down of the method according to the invention without damaging the structural material and/or the thermal barrier layer. In this way, a greatly increased efficiency of the gas turbine can be achieved.

In particular, the gas turbine is operated with operating temperatures above the above-mentioned values for a period of more than 10 minutes, preferably more than 30 minutes and particularly preferably more than 60 minutes. In this, an uninterrupted operation is meant. It has been shown in tests that longer periods of operation at high temperature are also possible due to the decelerated cool-down.

In one embodiment, the decelerated cool-down is performed to a temperature below 300° C., in particular below 200° C., preferably below 100° C. and particularly preferably below 50° C.

For example, the decelerated cool-down is performed down to room temperature. Following the decelerated cool-down, the gas turbine can be cooled down further to an even lower temperature. This can be achieved by immediate shutdown of the gas turbine without causing any damage. Alternatively, the gas turbine can continue to operate at the temperature reached.

This embodiment enables a particularly low-damage cool-down to low temperatures, which further increases the service life of the gas turbine. This is particularly advantageous in the case of a thermal barrier layer comprising YSZ. In conventional methods, the crystal structure is converted from tetragonal to monoclinic, which is typically associated with an increase in volume, which in turn leads to mechanical damage up to disintegration of the thermal barrier layer. Due to the decelerated cool-down down to the mentioned temperatures, this phase transformation is prevented. Also, the usually occurring stresses during cool-down from the highest temperatures are reduced or prevented, which deteriorate the lifetime of the thermal barrier layer during conventional operation. Thus, the relevant damage mechanisms of the thermal barrier layer are prevented by this embodiment and a particularly durable operation at temperatures significantly above 1200° C. is enabled.

In this context, a non-decelerated cool-down from the operating temperature to a temperature above the phase transition temperature of about 500° C. to 550° C. is not harmful. For example, this can be performed at a cooling rate of 50 K/s or below before the cool-down to lower temperatures.

In one embodiment, a cool-down from the operating temperature to a target temperature is performed without interruption and/or is performed within a time of at most 30 minutes, particularly at most 10 minutes and preferably at most 3 minutes.

The cool-down may mean the decelerated cool-down or another cooling process, which in particular takes place immediately before or after the decelerated cool-down. The target temperature means the temperature to which cooling is to be carried out. Following this, the temperature is thus in particular not to be reduced further. In particular, this is the temperature reached at the end of the decelerated cool-down. If necessary, the target temperature may mean an even lower temperature that is reached after a further cool-down following the decelerated cool-down. A cool-down without interruption means a cool-down characterized by continuously decreasing temperatures. This means that there are no intermittent temperature increases and, in particular, also no periods of constant temperature.

The uninterrupted and not too slow cool-down is especially significant when the gas turbine is cooled down to low temperatures below 200° to room temperature. When operating at a high operating temperature, the number of voids in equilibrium increases which stabilize the tetragonal structure. If the cool-down lasts too long and/or if the thermal barrier layer is exposed to high temperatures for too long during the cool-down, material transformation occurs, resulting in a lower equilibrium concentration of voids. At room temperature, the low concentration of voids is then frozen, which promotes a phase transformation towards a monoclinic crystal structure. The configuration of the invention described herein prevents this effect and thus ensures an even longer service life of the gas turbine.

In one configuration of the invention, the decelerated cool-down starts at the operating temperature. In other words, cooling is already performed in a decelerated manner from the operating temperature. Thus, the decelerated cool-down already takes place even at high temperatures, which thus further reduces damage to the thermal barrier layer.

In one embodiment, the temperature of the gas turbine is increased in a decelerated manner up to the operating temperature, at least for a period of time.

In other words, not only cooling down is performed in a decelerated manner, but there is also a decelerated increase in temperature. For the cooling rates of the decelerated increase in temperature, the same applies as for the cooling rates for the decelerated cool-down. In particular, the entire temperature increase is performed in a decelerated manner. This embodiment allows for even further reduction of damage to the thermal barrier layer.

In one embodiment, the decelerated cool-down is achieved at least proportionally by continuously reducing a power of the gas turbine at least for a period of time. Therefore, a control device is basically provided which is configured such that the power of the gas turbine is continuously reduced at least for a period of time. Preferably, the control device is configured such that a gas turbine cannot, at least in principle, be shut down in the classical sense, with the consequence that immediately after the shutdown the gas turbine is no longer in operation and/or sends cooling compressor air to the coated elements as a result of the continuous rotation of the turbine. Instead, a shutdown results in the power of the gas turbine being successively reduced until a permissible temperature of, for example, less than 200° C. is reached. The operation of the turbine is shut down completely only after this low temperature has been reached.

The gas turbine is therefore not shut down immediately, as is the case in conventional methods. Instead, the power is continuously reduced for at least a certain period of time, resulting in a decelerated cool-down. At least part of the deceleration is achieved by the continuous power reduction. In other words, the power is selectively reduced to achieve a desired temperature profile in which the gas turbine is cooled down in a decelerated manner. This can be achieved, for example, by selectively reducing the amount of fuel. In this way, a desired cooling rate of the temperature can be achieved in a particularly effective and easily controllable manner.

A continuous reduction is characterized by a continuous decrease of the power. This means that there are no intermittent increases in power and, in particular, no periods of constant power. In particular, the continuous reduction of the power occurs during the entire period of the decelerated cool-down.

In one embodiment, the decelerated cool-down is achieved at least in part by preventing an inflow of cold gas into the gas turbine.

A gas in the sense of the invention means a gaseous substance or mixture of substances. Mixture of substances also comprises dispersions with gaseous dispersion medium such as mist or smoke. A cold gas means a gas that is colder than the temperature inside the gas turbine, and thus is suitable for reducing the temperature inside the gas turbine. In conventional operation, this occurs immediately, so that a very rapid cool-down occurs which is thus prevented according to the invention. Inflowing cold gas can be, for example, compressed air and/or compressor air. In particular, preventing the inflow is used in addition to other measures to enable the decelerated cool-down of the gas turbine. At least part of the deceleration is achieved by preventing the inflow.

In one embodiment, a cool-down, in particular the decelerated cool-down, is achieved at least in parts by realizing an inflow of oxygen-reduced or oxygen-free gas, in particular nitrogen, into the gas turbine.

In other words, a gas or gas mixture with a reduced oxygen content or an oxygen-free gas or gas mixture is fed into the gas turbine. This typically has a temperature that is below the temperature of the gases contained in the gas turbine, so that the temperature of the gas turbine is reduced by the inflow.

In particular, this is done to cool down the gas turbine to a temperature below 400° C., in particular below 300° C., preferably below 200° and more preferably below 100° C. and in one embodiment to a temperature which substantially corresponds to the ambient temperature. If a temperature below 400° C., in particular below 300° C., preferably below 200° and particularly preferably below 100° C., is reached, the gas turbine is generally shut down completely so that no more power is generated.

This prevents the number of oxygen voids from being reduced, which stabilize the desired tetragonal structure.

For reasons of economy, a complete shutdown is performed when the temperature reaches more than 50° C., if the operation of the gas turbine is to be completely shut down.

In one embodiment, the gas turbine is a stationary gas turbine and the decelerated cool-down is performed without interruption to a temperature below 400° C., in particular below 300° C., preferably below 200° and particularly preferably below 100° C.

A stationary gas turbine is a permanently installed or immovable gas turbine, for example a gas turbine provided for power generation and/or a gas turbine of a power plant. Such gas turbines are usually not operated at medium temperatures in the range of about 700° C., but always at higher operating temperatures. It is significant here that a cool-down to below the phase transition temperature from tetragonal to monoclinic, which is around 500° C. to 550° C., is carried out in a decelerated manner to prevent damage to the thermal barrier layer.

In one embodiment, prior to a cool-down from an operating temperature between 550° C. and 1100° C. to a temperature below 100° C., the temperature of the gas turbine is increased from the operating temperature to at least 800° C., in particular at least 1200° C. and preferably at least 1300° C. This is followed by the decelerated cool-down.

In other words, the operating temperature is first increased after operation in the medium temperature range before the cool-down. In particular, this is done for complete shutdown of the gas turbine.

An increase to 800° C. should be effected for a duration of more than 5 min, and an increase to 1200° C. should be effected for a duration of at least 5 min. At higher temperatures, the duration can be reduced further accordingly. In particular, the increase in temperature is effected to at least 1000° C., preferably to at least 1400° C. and particularly preferably to at least 1500° C. In one embodiment, the increase in temperature is effected to the maximum possible temperature. This can be achieved by operating the gas turbine at maximum thrust and/or maximum power.

After the increase of the temperature of the gas turbine, the decelerated cool-down takes place. The decelerated cool-down can be effected over the entire temperature range. The intermediate increase in temperature increases the concentration of voids and no structural change occurs during cool-down due to the stabilization of the tetragonal structure.

In one embodiment, the gas turbine is an aircraft gas turbine. An aircraft gas turbine is a gas turbine that is used in an aircraft to generate thrust. In particular, it is part of an aircraft. During take-off of the aircraft, the aircraft gas turbine can be operated at an operating temperature of about 1200° C. During normal flight operation and/or during so-called idle, the aircraft gas turbine can be operated at an operating temperature between 550° C. and 1100° C., for example about 700° C. An abrupt change in power and/or prolonged operation at about 700° C. has an unfavorable effect on the material of the thermal barrier layer, as this reduces the concentration of voids. This is counteracted by the intermediate increase to a temperature above 1200° C., as described above.

A further aspect of the invention is a gas turbine assembly comprising a gas turbine and a control device for controlling the gas turbine. The gas turbine comprises a structural material and a protective layer disposed on the structural material, such as a thermal barrier layer or a corrosion protection layer. The control device is configured to operate the gas turbine at an operating temperature above 1000° C. and then to cool it in a decelerated manner so that, in particular, damage to the structural material and/or the thermal barrier layer is minimized.

In particular, the control device is configured to operate the gas turbine at an operating temperature above 1000° C. In particular, it is further configured to operate the gas turbine such that it is subsequently cooled in a decelerated manner.

All embodiments, features and advantages of the aspect of the invention mentioned at the beginning apply equally to the aspect described herein. In particular, the control device is configured to control the gas turbine in such a manner that the embodiments, features and advantages of the method mentioned at the beginning are feasible or achievable with the gas turbine assembly. A targeted reduction of the fuel quantity can be used for this purpose.

In the following, an exemplary embodiment of the invention is also explained in more detail with reference to figures.

Figure 2:
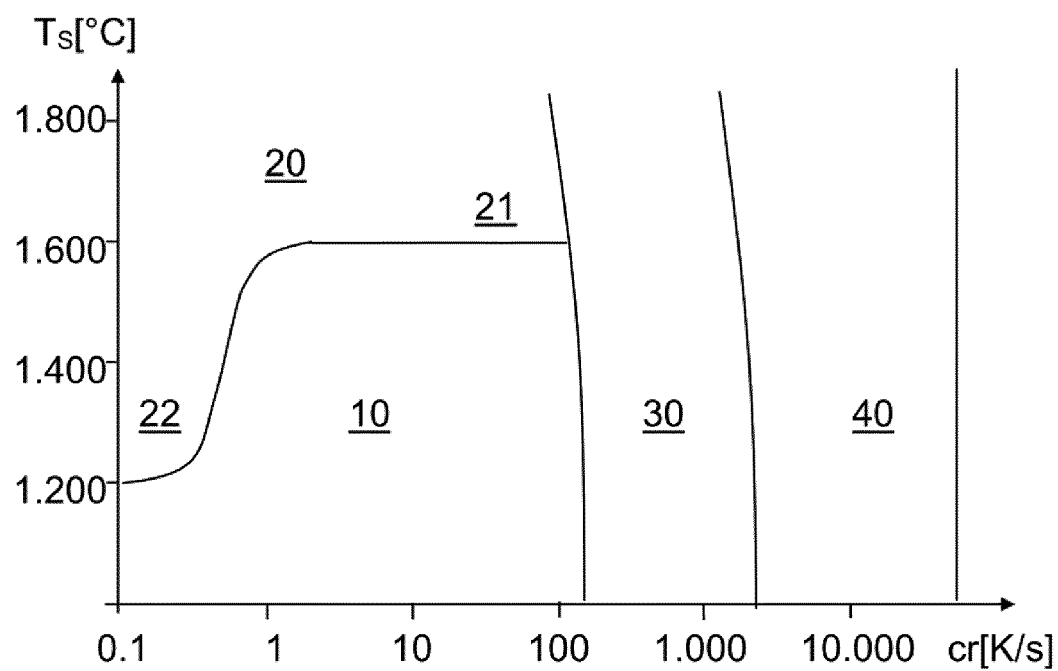

The Figures Show:

FIG. 1: a schematic representation of a part of a gas turbine assembly according to the invention, and FIG. 2: particularly advantageous operating conditions for performing the method according to the invention.

FIG. 1 shows a part of a gas turbine 1 of a gas turbine assembly according to the invention. A structural material 2 is shown, on which a protective layer 3 in the form of a thermal barrier layer is disposed. The thermal barrier layer is disposed directly on the structural material 2, i.e. there is no other layer in between.

The thermal barrier layer consists of zirconium oxide partially stabilized with yttrium oxide (YSZ). The thermal barrier layer was produced by a thermal spray process or by thermal evaporation in an electron beam evaporator. The structural material consists of a nickel-based superalloy.

The decelerated cool-down according to the invention excludes damage to the depicted part of gas turbine 1, even in continuous operation above temperatures of 1500° C.

The thickness ratios of the elements in this schematic representation are merely exemplary and may deviate significantly from this representation if necessary.

FIG. 2 shows the particularly advantageous safe operating conditions 10 in the area shown at the bottom left. However, higher temperatures can also be advantageous. The cooling rate cr at the decelerated cool-down in K/s is plotted in logarithmic form on the X axis. The surface temperature $T_s$ of the protective layer in ° C. is plotted on the Y axis.

It can be seen that the gas turbine can be operated in a particularly advantageous manner, i.e. safely and/or permanently and without damage, at cooling rates cr in a wide range between 1 K/s and slightly above 100 K/s up to 1600° C. The particularly advantageous safe operating conditions 10 run up to cooling rates cr of about 150 K/s, wherein lower surface temperatures $T_s$ are necessary in this range. At higher surface temperatures $T_s$, the described damaging phase transformation 20 takes place, wherein at rapid temperature change and at surface temperatures $T_s$ above 1600° C., in particular the cubic structure 21 is present, and at slow temperature change and at surface temperatures $T_s$ above 1200° C., in particular the monoclinic structure 22 is present.

At cooling rates cr up to approx. 0.3 K/s, temperatures $T_s$ above about 1200° C. are already damaging. This value increases rapidly up to cooling rates cr shortly below 1, where the described surface temperatures $T_s$ of 1600° C. are already possible.

At cooling rates cr between about 150 K/s and about 2000 K/s, early delamination 30 occurs, and at cooling rates cr above this, surface degradation 40 occurs. In particular, the cooling rate cr must not be too high at high surface temperatures $T_s$ and the cooling rate cr must not be too low at lower surface temperatures $T_s$.

LIST OF REFERENCE SIGNS

Gas turbine 1
Structural material 2
Protective layer 3
Safe operating conditions 10
Damaging phase transformation 20
Cubic structure 21
Monoclinic structure 22
Early delamination 30
Degradation 40
Surface temperature $T_s$
Cooling rate cr

The invention claimed is:

1. A method of operating a gas turbine at a high temperature, wherein the gas turbine has a structural material and a protective layer disposed on the structural material, and wherein the gas turbine is cooled down in a decelerated manner after operation of the gas turbine at an operating temperature above 1000° C., wherein the decelerated cool-down is performed at a cooling rate of less than 100 K/s, wherein a cool-down is achieved at least in parts by realizing an inflow of oxygen-reduced or oxygen-free gas into the gas turbine, wherein the inflow of oxygen-reduced or oxygen-free gas into the gas turbine is realized to cool down the gas turbine in a decelerated manner to a temperature below 100° C. at a cooling rate between 3 K/s and 15 K/s, wherein subsequently a complete shutdown of the gas turbine is performed when the temperature is above 50° C.

2. The method according to claim 1, wherein the gas turbine is operated at an operating temperature above 1200° C. before a cool-down.

3. The method according to claim 1, wherein the decelerated cool-down is performed to a temperature below 300° C.

4. The method according to claim 1, wherein a cool-down from the operating temperature to a target temperature is performed without interruption and/or within a time of at most 30 minutes.

5. The method according to claim 1, wherein the temperature of the gas turbine is increased up to the operating temperature in a decelerated manner at least for a period of time.

6. The method according to claim 1, wherein the deceleration of the cool-down is achieved at least in parts by preventing an inflow of cold gas into the gas turbine.

7. The method according to claim 1, wherein the gas turbine is a stationary gas turbine and the decelerated cool-down is performed without interruption to a temperature below 400° C.

8. The method according to claim 1, wherein prior to cool-down from an operating temperature between 550° C. and 1100° C. to a temperature below 100° C., the temperature of the gas turbine is increased from the operating temperature to at least 800° C., followed by the decelerated cool-down.

9. A gas turbine assembly for performing a method according to claim 1, comprising a gas turbine and a control device for controlling the gas turbine, wherein the gas turbine comprises a structural material and a protective layer disposed on the structural material, wherein the control device is configured to cool down the gas turbine in a decelerated manner after operation at an operating temperature above 1000° C., wherein the protective layer includes a corrosion protection layer, wherein a cool-down is achieved at least in parts by realizing an inflow of oxygen-reduced or oxygen-free gas into the gas turbine, wherein the inflow of oxygen-reduced or oxygen-free gas into the gas turbine is realized to cool down the gas turbine in a decelerated manner to a temperature below 100° C. at a cooling rate between 3 K/s and 15 K/s, wherein subsequently a complete shutdown of the gas turbine is performed when the temperature is above 50° C.

10. The method according to claim 1, wherein the protective layer includes a thermal barrier layer including zirconium oxide partially stabilized with yttria.

11. The method according to claim 10, wherein the zirconium oxide is partially stabilized with 4-5 mol % yttria.

12. The method according to claim 1, wherein the protective layer includes a thermal barrier layer including pyrochlore.

13. The method according to claim 1, wherein the protective layer includes a thermal barrier layer including $Gd_2Zr_2O_7$.

14. The method according to claim 13, wherein the thermal barrier layer comprises an upper layer, facing away from the structural component, comprising $Gd_2Zr_2O_7$, and a lower layer, arranged between the structural component and the upper layer, comprising zirconium oxide partially stabilized with yttria.

15. The method according to claim 1, wherein the protective layer includes a thermal barrier layer including perovskites.

16. A method of operating a gas turbine, the gas turbine comprising a structural material and a protective layer disposed on the structural material, the method comprising:
operating the gas turbine at an operating temperature above 1000° C.; and
subsequently cooling down the gas turbine in a decelerated manner at a cooling rate of less than 100 K/s,
wherein a cool-down is achieved at least in parts by realizing an inflow of oxygen-reduced or oxygen-free gas into the gas turbine, wherein the inflow of oxygen-reduced or oxygen-free gas into the gas turbine is realized to cool down the gas turbine in a decelerated manner to a temperature below 100° C. at a cooling rate between 3 K/s and 15 K/s, wherein subsequently a complete shutdown of the gas turbine is performed when the temperature is above 50° C.

17. The method according to claim 16, wherein the decelerated cool-down starts at the operating temperature.

18. The method according to claim 16, wherein a surface of the protective layer is cooled down at the cooling rate of less than 100 K/s.

19. The method according to claim 16, wherein the cooling rate is between 3 K/s and 15 K/s.

* * * * *